C. L. BRADLEY.
Combination Undersuits.
No. 8,069. Reissued Feb. 5, 1878.
Fig. 2
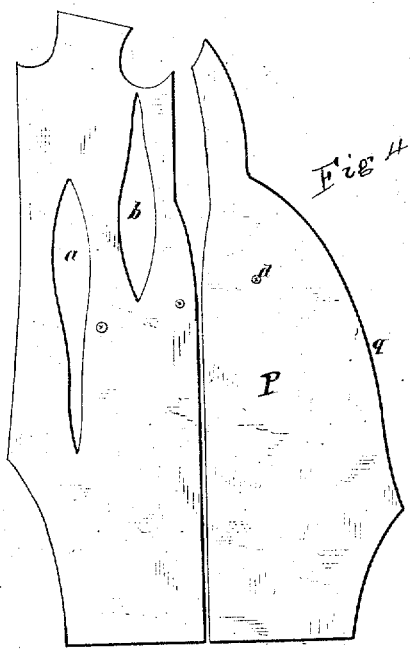
Fig. 4.
Fig. 3.
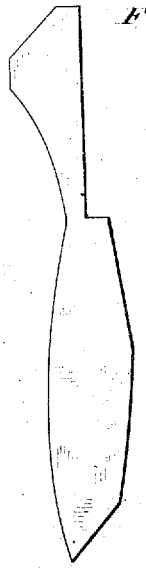
Fig. 5.
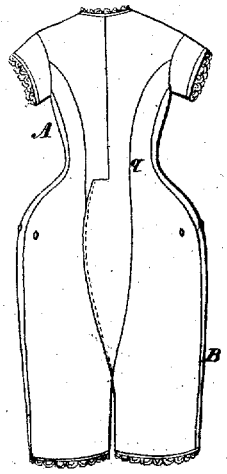
Fig. 1.
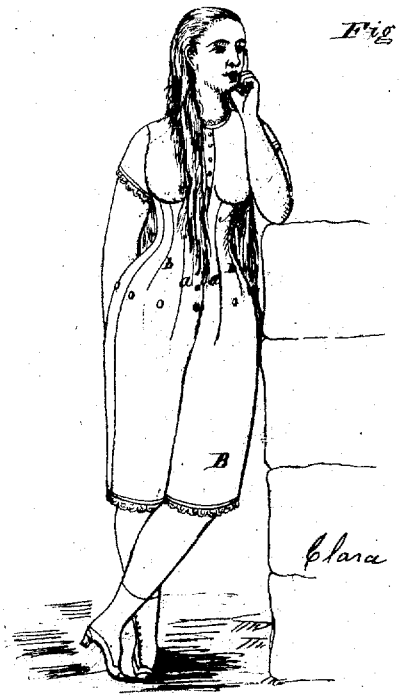
Witnesses
Harry King
C. L. Bradley
Inventor.
Clara Lynde Bradley

UNITED STATES PATENT OFFICE.

CLARA L. BRADLEY, OF SAN FRANCISCO, CALIFORNIA.

IMPROVEMENT IN COMBINATION UNDERSUITS.

Specification forming part of Letters Patent No. 198,505, dated December 25, 1877; Reissue No. 8,069, dated February 5, 1878; application filed January 21, 1878.

*To all whom it may concern:*

Be it known that I, CLARA LYNDE BRADLEY, of the city and county of San Francisco, State of California, have invented a new and useful Improvement in Underwear, of which the following is a specification, reference being had to the accompanying drawings.

My invention relates to an improved combination undersuit, essentially for female wear; and consists in so constructing said garment that the upper or vest portion is tight or glove fitting to the form, and the portion below the waist loose-fitting.

Heretofore garments of a similar character have been made loose or sack fitting at and above the waist-line, the weight being supported from the shoulders, while in my improvement the weight is distributed over the whole contour of the form.

Two or more pieces are employed for each half of the garment, the number of pieces depending upon the width of the material to be used.

Referring to the drawings, Figure 1 represents a suit for female wear; Fig. 2, a pattern of one-half of the front of same; Fig. 3, a pattern of one-half of the back of the same; Fig. 4, a pattern of one-half of the side piece of same. Fig. 5 represents a back view of the garment.

When the material admits, the patterns represented by Figs. 2 and 4 may be cut in one piece, thereby dispensing with the seam outside the leg.

The pattern, Fig. 2, representing one-half of the front of the garment, is united, as to its upper portion, to the pattern, Fig. 4, by a seam that extends from a point under the arm to the waist-line, at which point the pattern has a spring, to accommodate the larger dimensions around the hips. These two patterns are extended down so as to form one leg of the garment.

The side piece, Fig. 4, is cut narrow to the hips, and is made full below.

The back piece, Fig. 3, is made wide between the shoulders, and tapers to the waist, from which it again widens, being cut with a nearly straight offset at the waist-line on one side and curved on the other side. The curved edge I sew to the side piece, Fig. 4, while its opposite or offsetting edge forms a flap for overlapping the edge of the opposite back piece.

In the garment for female wear I provide one dart, *b*, as shown at Fig. 2, extending from a point just below the armhole to a proper distance below the waist-line, and also another dart, *a*, a short distance in front of the dart *b*, which extends, approximately, from the apex of the breast down to a point opposite the fork of the leg portion. By means of these darts the garment is made glove-fitting, or to conform tightly to the figure above the hips.

Sustaining devices are provided at a suitable distance below the waist-line, as shown in Figs. 1 and 5.

When the garment is intended for male wear, the darts *a b* are dispensed with.

In the suit, the union of the pattern, Fig. 3, to the edge *p* of the pattern, Fig. 4, as aforesaid, produces a seam, *q*, Fig. 5, which seam passes from the armhole in the back, below the shoulder, down over the buttock, to a point below the crotch of the garment, instead of straight down the side, which permits and affords a greater amount of spring, and allowing the suit to rest perfectly easy on the lower part of the body, while the upper part is tight-fitting, thus permitting the free movement or bending of the body, without excessive or unequal strain upon the garment.

The garment can be made low-necked and with sleeves without departing from the spirit of my invention.

I am aware that a suit for underwear consisting of vest and drawers portions combined to form a single garment is not new, the same being fully described in English patent No. 415, of A. D. 1862. I am also aware of the patent to Lydia P. Bonney, No. 171,467, and dated December 28, 1875, and lay no claim to the undersuit described and shown, or the patterns therein claimed; but What I do claim as new and of my invention, and desire to secure by Letters Patent, is—

1. A garment for underwear consisting of an upper or vest portion, A, and a lower or drawers portion, B, combined, the portion A, at and above the waist-line, being cut and made to be tight or glove fitting, as contradistinguished from the sack form, and the portion B, below said waist-line, made loose and flowing, substantially as described, for the purpose of supporting and protecting the vital portions of the body of the wearer, and at the same time to allow of the free movement of the lower limbs, as specified.

2. The patterns 2, 3, and 4, forming each half of the garment, cut the whole length of the garment, and of the configuration shown, sewed together, and adapted to fit the form, substantially as herein shown and described.

3. A combination suit for underwear, essentially as described, and having a seam extending transversely downward from a point at the armhole below the shoulder, across the buttock, to a point below the crotch of the garment, substantially as specified.

4. In a combination under-garment made of two or more pieces, the seam *q*, as and for the purposes set forth.

In witness whereof I have hereunto set my hand.

CLARA LYNDE BRADLEY.

Witnesses:
LIZZIE A. ELDRED,
EMILY S. C. FINCH.